(12) United States Patent
Zhang et al.

(10) Patent No.: US 8,942,223 B2
(45) Date of Patent: Jan. 27, 2015

(54) INTERFERENCE CANCELATION USING EDGE SIGNALS FOR SYNCHRONIZATION SIGNAL DETECTION

(75) Inventors: Xiaoxia Zhang, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 611 days.

(21) Appl. No.: 13/077,685

(22) Filed: Mar. 31, 2011

(65) Prior Publication Data

US 2012/0076213 A1 Mar. 29, 2012

Related U.S. Application Data

(60) Provisional application No. 61/322,223, filed on Apr. 8, 2010.

(51) Int. Cl.
*H04B 1/10* (2006.01)
*H04L 27/26* (2006.01)
(Continued)

(52) U.S. Cl.
CPC ......... *H04L 27/2662* (2013.01); *H04J 11/0056* (2013.01); *H04J 11/0069* (2013.01); *H04L 5/0023* (2013.01); *H04L 5/0048* (2013.01)
USPC ............................ 370/350; 455/63.1; 455/502

(58) Field of Classification Search
CPC .................. H04L 25/03159; H04L 25/03012; H04L 25/0328
USPC ................................. 370/350; 455/63.1, 502
See application file for complete search history.

(56) References Cited

U.S. PATENT DOCUMENTS 6,480,558 B1 11/2002 Ottosson et al.
7,184,485 B2 * 2/2007 Balakrishnan et al. ....... 375/260
(Continued)

FOREIGN PATENT DOCUMENTS

CN 101388723 A 3/2009
JP 2009239472 A 10/2009
KR 20070024310 A 3/2007

OTHER PUBLICATIONS

International Search Report and Written Opinion—PCT/US2011/031835, International Search Authority—European Patent Office—Aug. 26, 2011.

(Continued)

*Primary Examiner* — Dang Ton
*Assistant Examiner* — Robert M Morlan
(74) *Attorney, Agent, or Firm* — Tyler J. Overall

(57) ABSTRACT

In 3GPP Release (Rel) 8, a primary synchronization signal (PSS) and a secondary synchronization signal (SSS) may be transmitted in six resource blocks, occupying, for example, the center 62 tones (i.e., subcarriers) of an LTE-A system, wherein the center tone may be skipped. In synchronous networks, cells may transmit their respective PSS and SSS on the same frequency at the same time, wherein strong cells may overshadow the weak ones. However, strong cells may not be the serving cell for a user equipment (UE), particularly in a heterogeneous network. Traditionally, interference cancelation, an enhanced receiver technique, has been used, wherein the UE may first find the strong cells and cancel them out to find the serving cell. However, due to propagation delay and synchronization uncertainty, a timing offset may exist among cells, even in synchronous networks. Therefore, systems and methods are disclosed, providing for improved handling of the timing offset among different cells by applying a time domain cancelation.

32 Claims, 6 Drawing Sheets

(51) Int. Cl.
*H04J 11/00* (2006.01)
*H04L 5/00* (2006.01)

(56) References Cited

U.S. PATENT DOCUMENTS

| | | | |
|---|---|---|---|
| 7,672,383 B2* | 3/2010 | Namgoong et al. | 375/260 |
| 7,680,458 B2* | 3/2010 | Lim et al. | 455/63.1 |
| 2003/0119451 A1 | 6/2003 | Jang et al. | |
| 2004/0023631 A1* | 2/2004 | Deutsch et al. | 455/283 |
| 2004/0213354 A1* | 10/2004 | Jones et al. | 375/285 |
| 2006/0187887 A1 | 8/2006 | Kim et al. | |
| 2007/0201422 A1* | 8/2007 | Swarts et al. | 370/342 |
| 2010/0029262 A1 | 2/2010 | Wang et al. | |
| 2010/0054115 A1* | 3/2010 | Roh et al. | 370/208 |
| 2010/0069066 A1 | 3/2010 | Shen et al. | |
| 2010/0183104 A1* | 7/2010 | Alexander et al. | 375/346 |

OTHER PUBLICATIONS

Hoshino, K., et al., "A Study on Timing Offset Interference Canceller in Multi-link Transmission," Technical Report of the Institute of Electronics, Information and Communication Engineers, Jan. 18, 2008, vol. 107, No. 439, pp. 13-18, RCS2007-163.

Qualcomm Europe: "Heterogeneous Networks: General views", 3GPP R1-094224, Oct. 16, 2009, pp. 4.

Samsung: "Performance evaluation of Home eNB ICIC function based on time/frequency domain silencing", 3GPP, R1-103049, May 14, 2010.

Yuan Shen, et al., "Neighboring Cell Search Techniques for LTE Systems", Communications (ICC), 2010 IEEE International Conference on, IEEE, Piscataway, NJ, USA, May 23, 2010, pp. 1-6, XP031703651, ISBN: 978-1-4244-6402-9.

* cited by examiner

INTERFERENCE CANCELATION USING EDGE SIGNALS FOR SYNCHRONIZATION SIGNAL DETECTION

CLAIM OF PRIORITY UNDER 35 U.S.C. §119

The present application for patent claims benefit of U.S. Provisional Patent Application Ser. No. 61/322,223, entitled, "Implementation of PSS and SSS interference cancelation", filed Apr. 8, 2010, and assigned to the assignee hereof and hereby expressly incorporated by reference herein.

TECHNICAL FIELD

Certain aspects of the present disclosure generally relate to wireless communications and, more particularly, to a method for applying a time domain cancelation in obtaining a synchronization signal from a serving cell.

BACKGROUND

Wireless communication systems are widely deployed to provide various types of communication content such as voice, data, and so on. These systems may include multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

In 3GPP Release (Rel) 8, a primary synchronization signal (PSS) and a secondary synchronization signal (SSS) may be transmitted in six resource blocks, occupying, for example, the center 62 tones (i.e., subcarriers) of an LTE-A system, wherein the center tone may be skipped. In synchronous networks, cells may transmit their respective PSS and SSS on the same frequency at the same time, wherein strong cells may overshadow the weak ones. However, strong cells may not be the serving cell for a user equipment (UE), particularly in a heterogeneous network. Traditionally, interference cancelation, an enhanced receiver technique, has been used, wherein the UE may first find the strong cells and cancel them out to find the serving cell. However, due to propagation delay and synchronization uncertainty, a timing offset may exist among cells, even in synchronous networks. Therefore, systems and methods are disclosed, providing for improved handling of the timing offset among different cells by applying a time domain cancelation.

Certain aspects of the present disclosure provide a method for wireless communications. The method generally includes receiving a composite signal comprising a synchronization signal transmitted from a serving cell; detecting, within the composite signal, at least one other synchronization signal transmitted from at least one neighbor cell; reconstructing the at least one other synchronization signal; generating a combined signal by combining edge tones and a center tone from the composite signal with the reconstructed synchronization signal; and canceling the combined signal from the composite signal to obtain the synchronization signal from the serving cell.

Certain aspects of the present disclosure provide an apparatus for wireless communications. The apparatus generally includes means for receiving a composite signal comprising a synchronization signal transmitted from a serving cell; means for detecting, within the composite signal, at least one other synchronization signal transmitted from at least one neighbor cell; means for reconstructing the at least one other synchronization signal; means for generating a combined signal by combining edge tones and a center tone from the composite signal with the reconstructed synchronization signal; and means for canceling the combined signal from the composite signal to obtain the synchronization signal from the serving cell.

Certain aspects of the present disclosure provide an apparatus for wireless communications. The apparatus generally includes at least one processor configured to receive a composite signal comprising a synchronization signal transmitted from a serving cell, detect, within the composite signal, at least one other synchronization signal transmitted from at least one neighbor cell, reconstruct the at least one other synchronization signal, generate a combined signal by combining edge tones and a center tone from the composite signal with the reconstructed synchronization signal, and cancel the combined signal from the composite signal to obtain the synchronization signal from the serving cell.

Certain aspects provide a computer-program product for wireless communications. The computer-program product typically includes a computer-readable medium having instructions stored thereon, the instructions being executable by one or more processors. The instructions generally include code for receiving a composite signal comprising a synchronization signal transmitted from a serving cell; code for detecting, within the composite signal, at least one other synchronization signal transmitted from at least one neighbor cell; code for reconstructing the at least one other synchronization signal; code for generating a combined signal by combining edge tones and a center tone from the composite signal with the reconstructed synchronization signal; and code for canceling the combined signal from the composite signal to obtain the synchronization signal from the serving cell.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
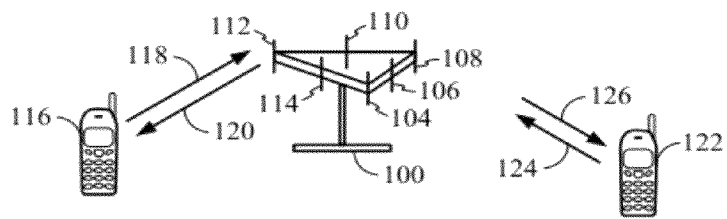
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
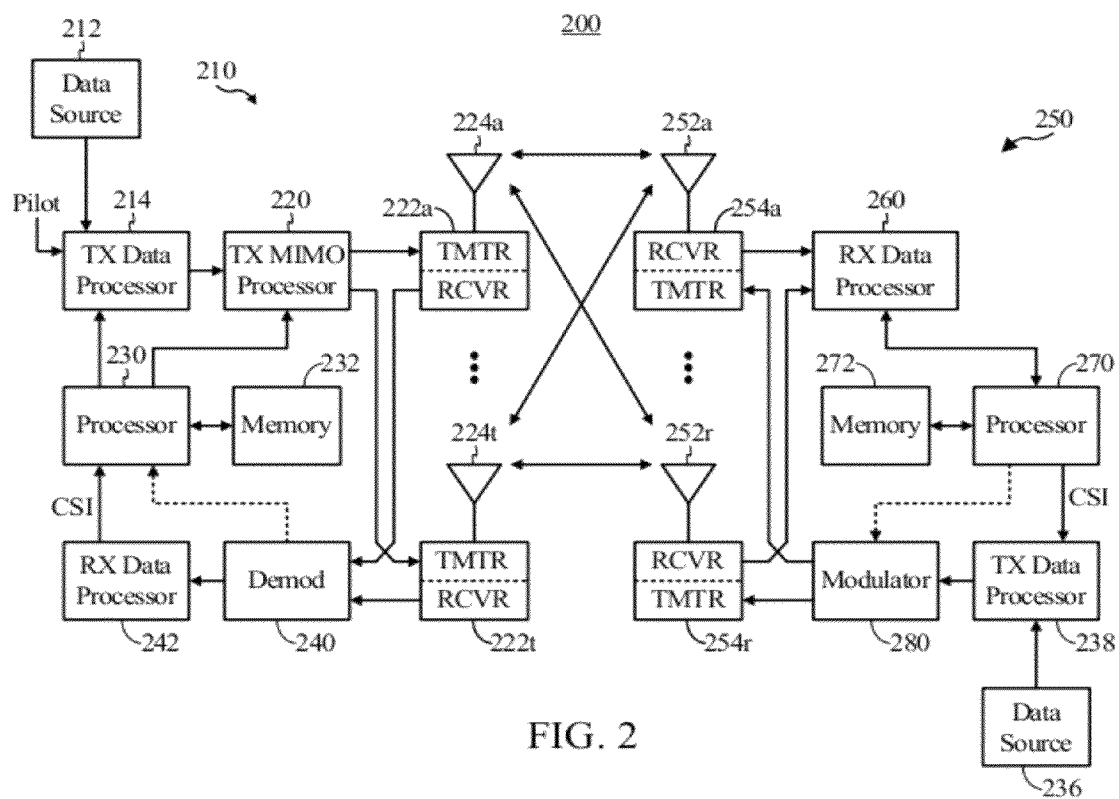
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights, and then processes the extracted message.

Figure 3:
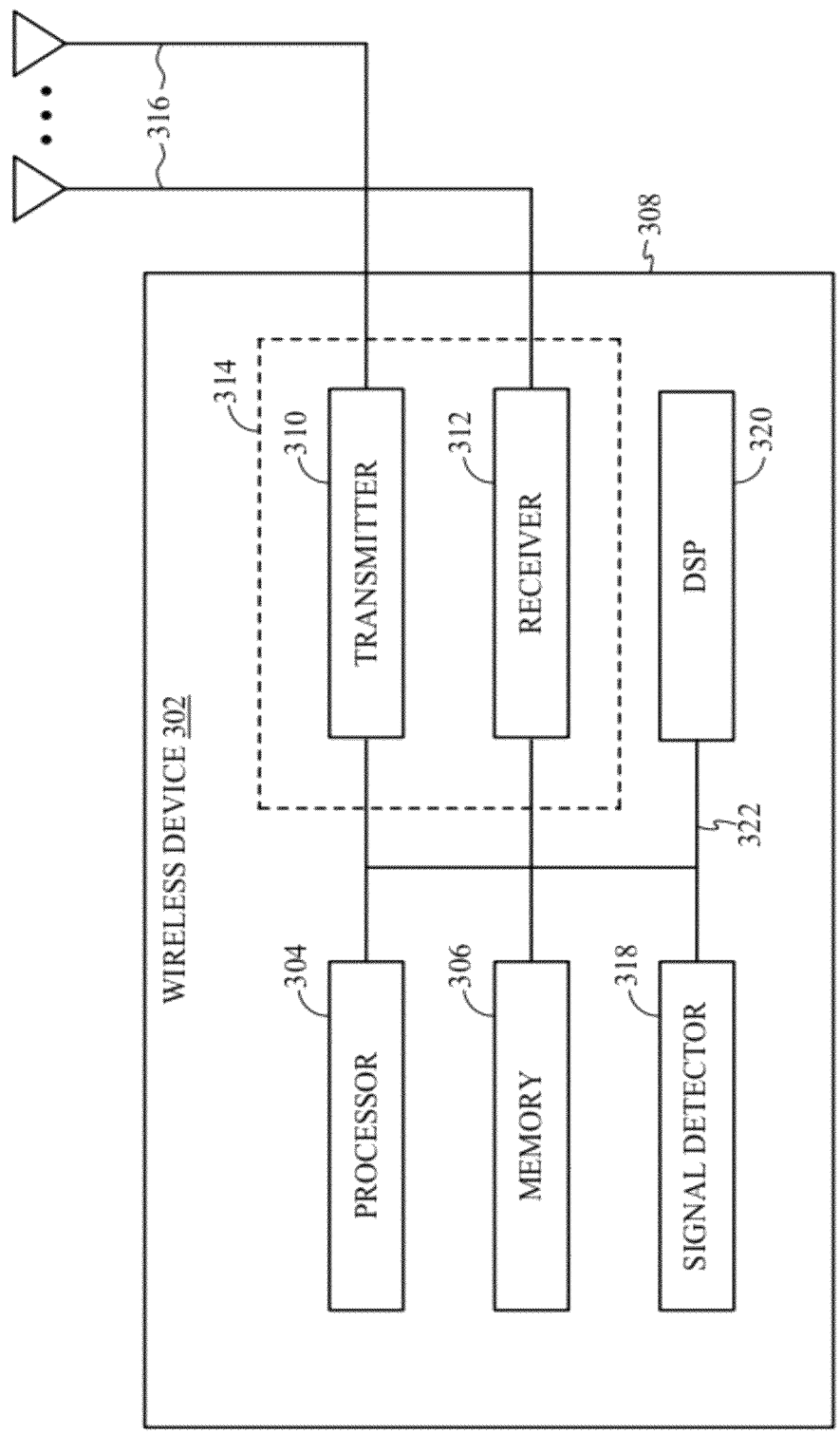
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may include a base station 100 or any of user terminals 116 and 122.

The wireless device 302 may include a processor 304, which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314.

The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Interference Cancelation Using Edge Signals for Synchronization Signal Detection In 3GPP Release (Rel) 8, a primary synchronization signal (PSS) and a secondary synchronization signal (SSS) may be transmitted in six resource blocks, occupying, for example, the center 62 tones (i.e., subcarriers) of an LTE-A system, wherein the center subcarrier may be skipped. Therefore, the synchronization signals may be transmitted on the 31 subcarriers on either side of the center subcarrier. In synchronous networks, cells may transmit their respective PSS and SSS on the same frequency at the same time, wherein strong cells may overshadow the weak ones. However, strong cells may not be the serving cell for a user equipment (UE), particularly in a heterogeneous network. Further, due to propagation delay and synchronization uncertainty, a timing offset may exist among cells, even in synchronous networks. Certain aspects of the present disclosure provide for improved handling of the timing offset among different cells by applying a time domain cancelation.

Figure 4:
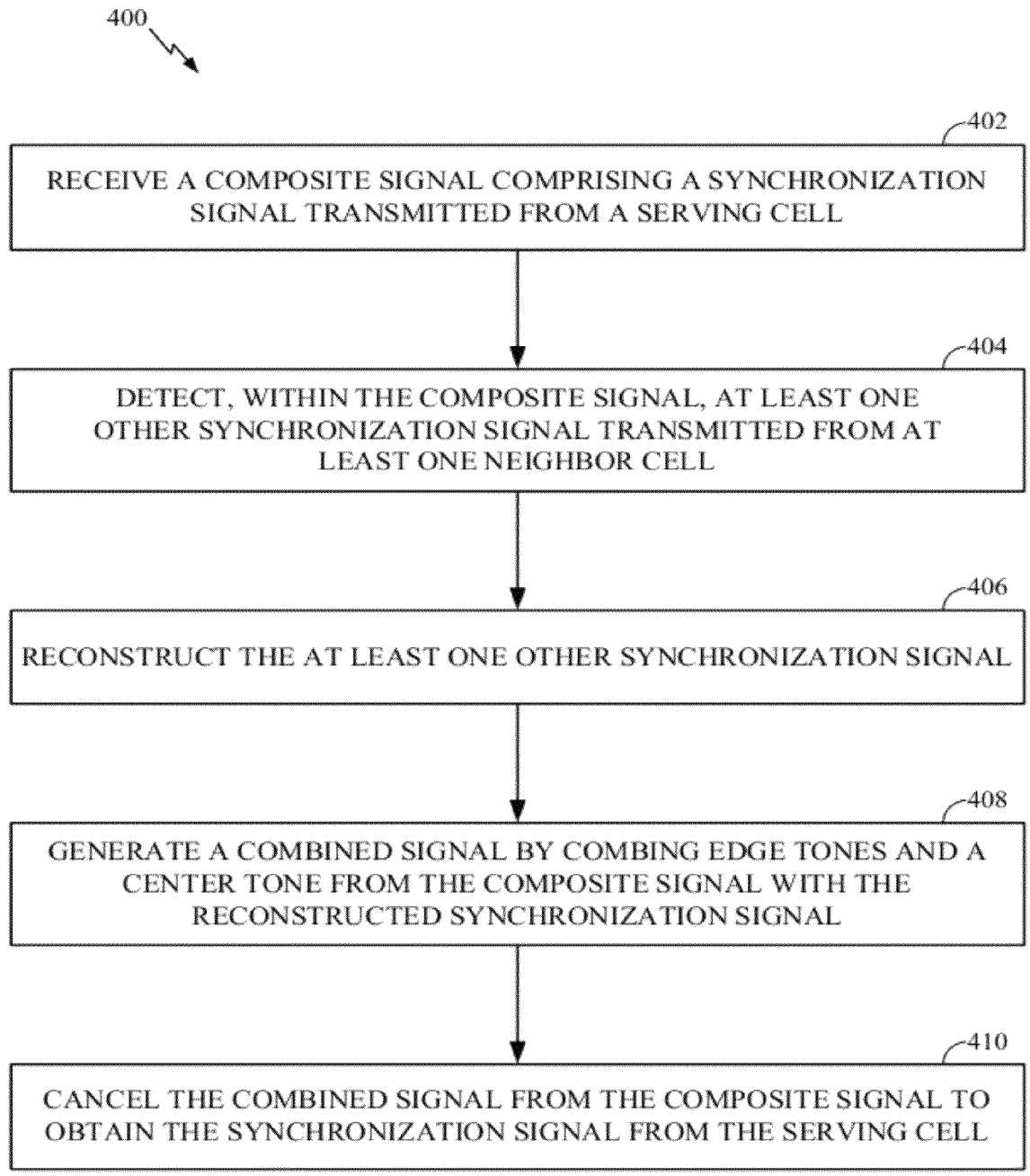
FIG. 4 illustrates example operations for performing time domain cancelation in accordance with certain aspects of the present disclosure.

FIG. 4 illustrates operations 400 for performing time domain cancelation in accordance with certain aspects of the present disclosure. The operations 400 may be performed, for example, by the receiver system 250 (e.g., a UE) for performing time domain cancelation.

At 402, the UE may receive a composite signal comprising a synchronization signal transmitted from a serving cell. The composite signal may include signaling from multiple cells, including both the serving cell and at least one non-serving cell.

At 404, the UE may detect, within the composite signal, at least one synchronization signal transmitted from at least one neighboring non-serving cell. The synchronization signals may comprise at least one of a primary synchronization signal (PSS) or a secondary synchronization signal (SSS), but is not limited thereto and may include any signals sufficient for synchronizing a UE with a serving cell.

At 406, the UE may reconstruct the at least one other synchronization signal. For example, the reconstruction may be performed by the RX data processor 260 of the receiver system 250. An inverse fast Fourier transform (IFFT) may be performed to reconstruct the at least one synchronization signal in the time domain.

At 408, the UE may generate a combined signal by combining edge tones and a center tone from the composite signal with the reconstructed synchronization signal. The combined signal may serve as an appropriate frequency domain filter for signal reconstruction to ensure that signals outside of the useful 62 tones may be nulled out. For some embodiments, when generating the combined signal, a cyclic prefix (CP) may be added. For some embodiments, the combining may be performed in the time domain. For other embodiments, the combining may be performed in the frequency domain. The number of edge tones combined may be dependent on a fast Fourier transform (FFT) size.

At 410, the UE may cancel the combined signal from the composite signal to obtain the synchronization signal from the serving cell (i.e., using time domain cancelation).

Figure 4A:
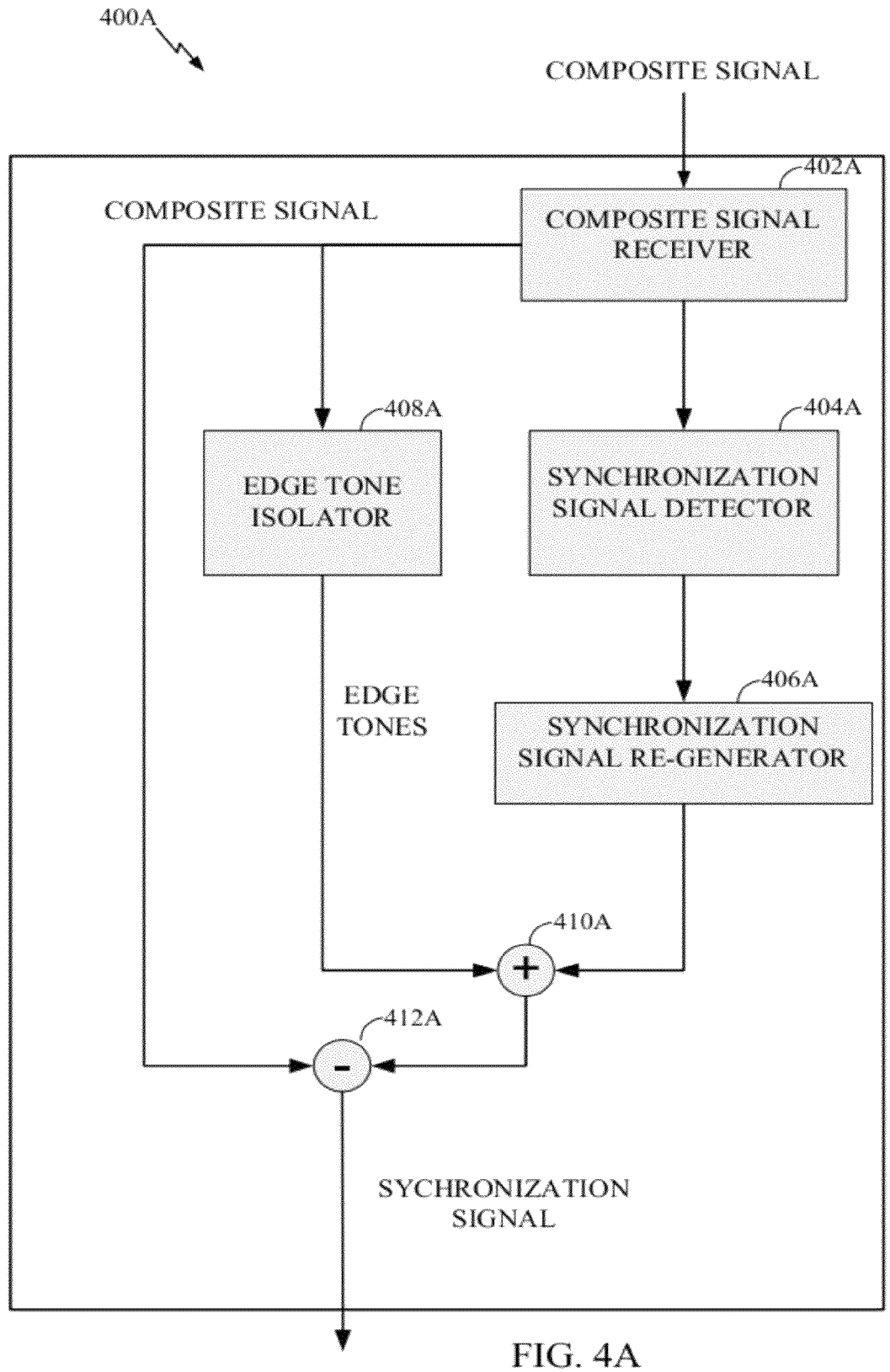
FIG. 4A illustrates example components capable of performing the operations illustrated in FIG. 4.

Operation 400 illustrated in FIG. 4 may correspond to means 400A illustrated in FIG. 4A. Composite signal receiver 402A may receive a composite signal comprising a synchronization signal transmitted from a serving cell (step 402). Synchronization signal detector 404A may detect, within the composite signal, at least one synchronization signal transmitted from at least one neighboring non-serving cell (step 404). Synchronization signal re-generator 406A may reconstruct the at least one other synchronization signal (step 406). Edge tone isolator 408A may isolate edge tones and a center tone from the composite signal. At 410A, a combined signal may be generated by combining the edge tones and the center tone with the reconstructed synchronization signal (step 408). At 412A, the combined signal may be canceled from the composite signal to obtain the synchronization signal from the serving cell (step 410).

Figure 5A:
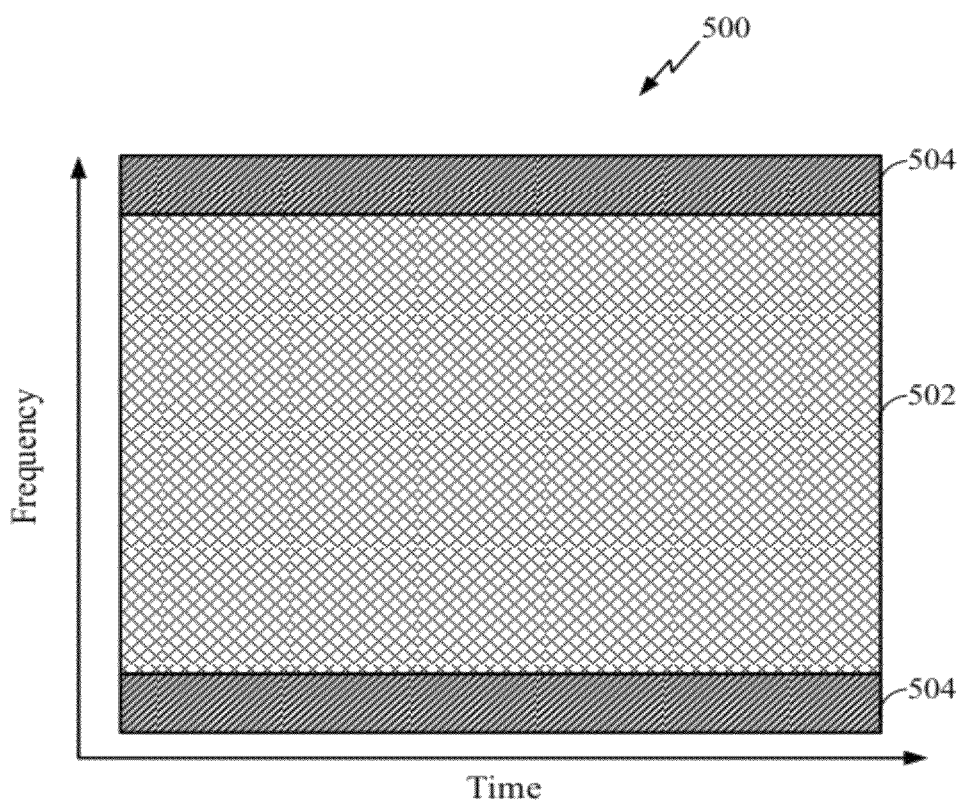
FIGS. 5A-D illustrate the processing of synchronization signals in accordance the operations illustrated in FIG. 4.

FIGS. 5A-D illustrate the processing of synchronization signals received by a UE, in accordance with example operations 400. As illustrated in FIG. 5A, the UE receives a composite signal 500 that include edge tones 504 and synchronization signals 502 transmitted from multiple cells. According to the illustration, the composite signal 500 is transmitted in six resource blocks, wherein the synchronization signals 502 occupy the center 62 subcarriers (i.e., tones) of the resource blocks. In synchronous networks, since cells may transmit their respective synchronization signals (e.g., PSS and SSS) on the same frequency at the same time, strong cells may overshadow the weak ones (see, e.g., synchronization signals 502 transmitted from the multiple cells). However, as described earlier, the detected strong cells may not include the desired serving cell for a UE, particularly in a heterogeneous network.

Figure 5B:
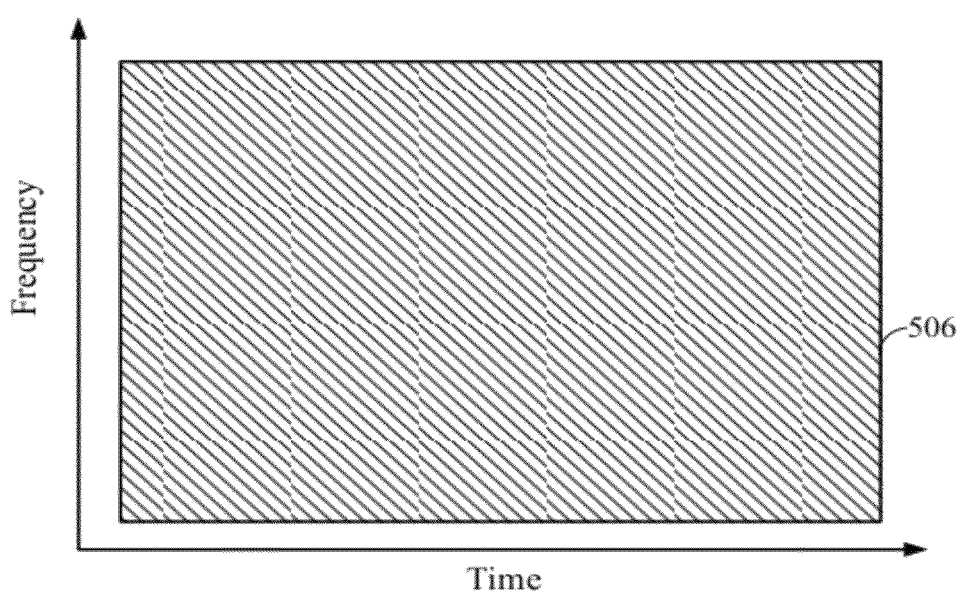

As illustrated in FIG. 5B, the UE detects, within the composite signal 500, at least one synchronization signal 506 transmitted from at least one neighbor cell. The synchronization signals may comprise at least one of a PSS or a SSS. The UE may reconstruct the at least one other synchronization signal 506. For example, an inverse fast Fourier transform (IFFT) may be performed to reconstruct a synchronization signal in the time domain.

Figure 5C:
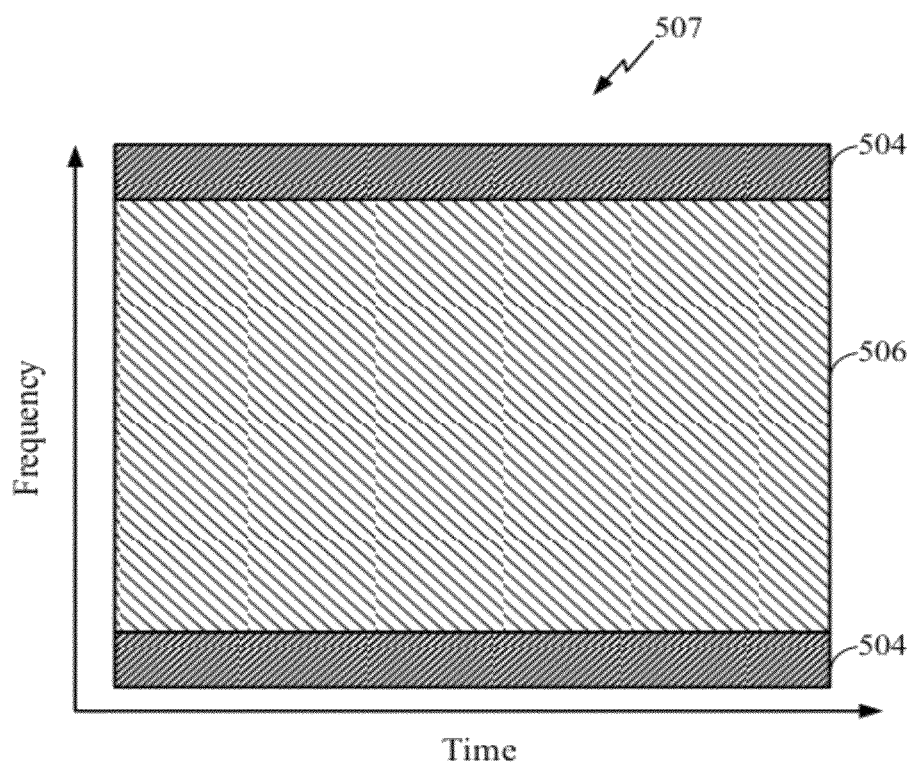
Figure 5D:
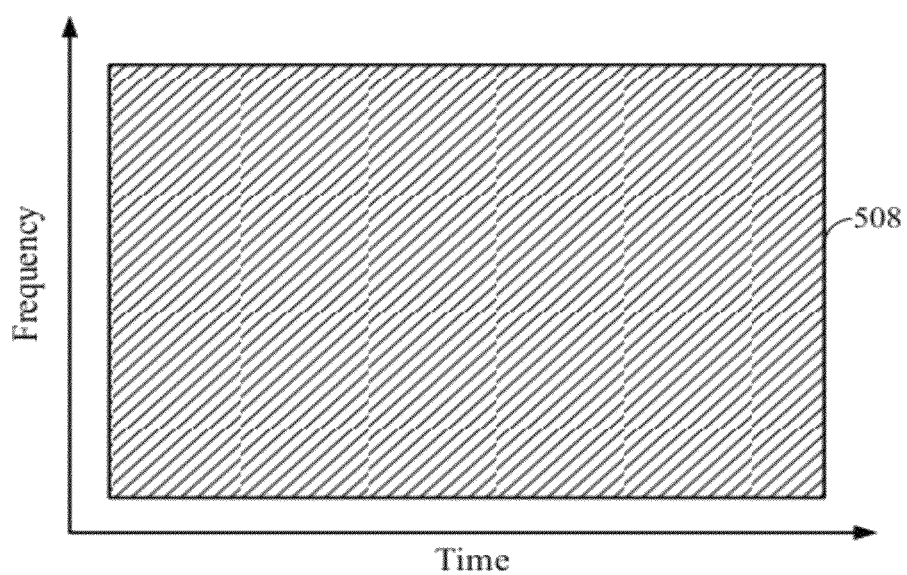

As illustrated in FIG. 5C, the UE generates a combined signal 507 by combining edge tones 504 and a center tone (not shown) received in the composite signal 500 with the reconstructed synchronization signal 506. This may serve as an appropriate frequency domain filter for signal reconstruction to ensure that signals outside of the tones of the synchronization signal may be nulled out. For some embodiments, the combining may be performed in the time domain. For other embodiments, the combining may be performed in the frequency domain (e.g., before performing IFFT). The UE may then cancel the combined signal 507 from the composite signal 500 to obtain the synchronization signal 508 from the serving cell (i.e., time domain cancelation), as illustrated in FIG. 5D.

Certain aspects of the present disclosure provide for improved handling of the timing offset among different cells by applying a time domain cancelation. Further, frequency domain reconstruction with copying received signals on the edge tones and center tones may have improved performance compared to simply zero padding the edge tones and center tones. For example, the probability of detection by a UE of a particular cell may increase due to the combination of the edge tones and the center tone with the synchronization signal when applying the time domain cancelation.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may include a microprocessor, but in the alternative, the processor may include any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may include any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
   receiving a composite signal comprising a synchronization signal transmitted from a serving cell;
   detecting, within the composite signal, at least one other synchronization signal transmitted from at least one neighbor cell;
   reconstructing the at least one other synchronization signal;
   generating a combined signal by combining edge tones and a center tone from the composite signal with the reconstructed synchronization signal; and
   canceling the combined signal from the composite signal to obtain the synchronization signal from the serving cell.

2. The method of claim 1, wherein the synchronization signals comprises at least one of a primary synchronization signal (PSS) or a secondary synchronization signal (SSS).

3. The method of claim 1, wherein the reconstructing is performed in time domain.

4. The method of claim 3, wherein the reconstructing the at least one other synchronization signal in time domain comprises performing inverse fast Fourier transform (IFFT).

5. The method of claim 1, further comprising adding a cyclic prefix (CP) when generating the combined signal.

6. The method of claim 1, wherein the combining is performed in time domain.

7. The method of claim 1, wherein the combining is performed in frequency domain.

8. The method of claim 1, wherein a number of the edge tones combined is dependent on a fast Fourier transform (FFT) size.

9. An apparatus for wireless communications, comprising:
   means for receiving a composite signal comprising a synchronization signal transmitted from a serving cell;
   means for detecting, within the composite signal, at least one other synchronization signal transmitted from at least one neighbor cell;
   means for reconstructing the at least one other synchronization signal;
   means for generating a combined signal by combining edge tones and a center tone from the composite signal with the reconstructed synchronization signal; and
   means for canceling the combined signal from the composite signal to obtain the synchronization signal from the serving cell.

10. The apparatus of claim 9, wherein the synchronization signals comprises at least one of a primary synchronization signal (PSS) or a secondary synchronization signal (SSS).

11. The apparatus of claim 9, wherein the reconstructing is performed in time domain.

12. The apparatus of claim 11, wherein the means for reconstructing the at least one other synchronization signal in time domain comprises means for performing inverse fast Fourier transform (IFFT).

13. The apparatus of claim 9, further comprising means for adding a cyclic prefix (CP) when generating the combined signal.

14. The apparatus of claim 9, wherein the combining is performed in time domain.

15. The apparatus of claim 9, wherein the combining is performed in frequency domain.

16. The apparatus of claim 9, wherein a number of the edge tones combined is dependent on a fast Fourier transform (FFT) size.

17. An apparatus for wireless communications, comprising:
   at least one processor configured to receive a composite signal comprising a synchronization signal transmitted from a serving cell, detect, within the composite signal, at least one other synchronization signal transmitted from at least one neighbor cell, reconstruct the at least one other synchronization signal, generate a combined signal by combining edge tones and a center tone from the composite signal with the reconstructed synchronization signal, and cancel the combined signal from the composite signal to obtain the synchronization signal from the serving cell.

18. The apparatus of claim 17, wherein the synchronization signals comprises at least one of a primary synchronization signal (PSS) or a secondary synchronization signal (SSS).

19. The apparatus of claim 17, wherein the at least one processor configured to reconstruct is performed in time domain.

20. The apparatus of claim 19, wherein the at least one processor configured to reconstruct the at least one other synchronization signal in time domain comprises performing inverse fast Fourier transform (IFFT).

21. The apparatus of claim 17, wherein the at least one processor is configured to add a cyclic prefix (CP) when generating the combined signal.

22. The apparatus of claim 17, wherein the combining is performed in time domain.

23. The apparatus of claim 17, wherein the combining is performed in frequency domain.

24. The apparatus of claim 17, wherein a number of the edge tones combined is dependent on a fast Fourier transform (FFT) size.

25. A computer-program product stored on a non-transitory computer-readable medium and comprising code instructing one or more processors to execute a process, comprising:
   receiving a composite signal comprising a synchronization signal transmitted from a serving cell;
   detecting, within the composite signal, at least one other synchronization signal transmitted from at least one neighbor cell;
   reconstructing the at least one other synchronization signal;
   generating a combined signal by combining edge tones and a center tone from the composite signal with the reconstructed synchronization signal; and
   canceling the combined signal from the composite signal to obtain the synchronization signal from the serving cell.

26. The computer-program product of claim 25, wherein the synchronization signals comprises at least one of a primary synchronization signal (PSS) or a secondary synchronization signal (SSS).

27. The computer-program product of claim 25, wherein the reconstructing is performed in time domain.

28. The computer-program product of claim 27, wherein the code for reconstructing the at least one other synchronization signal in time domain comprises code for performing inverse fast Fourier transform (IFFT).

29. The computer-program product of claim 25, further comprising code for adding a cyclic prefix (CP) when generating the combined signal.

30. The computer-program product of claim 25, wherein the combining is performed in time domain.

31. The computer-program product of claim 25, wherein the combining is performed in frequency domain.

32. The computer-program product of claim 25, wherein a number of the edge tones combined is dependent on a fast Fourier transform (FFT) size.

* * * * *